(12) United States Patent
Yabui et al.

(10) Patent No.: US 11,875,078 B2
(45) Date of Patent: Jan. 16, 2024

(54) DISPLAY SYSTEM, DISPLAY METHOD, AND COMPUTER PROGRAM

(71) Applicant: EIZO Corporation, Hakusan (JP)

(72) Inventors: Tomohiko Yabui, Hakusan (JP); Hideki Kitayama, Hakusan (JP); Kiyoyuki Tanaka, Hakusan (JP)

(73) Assignee: EIZO CORPORATION, Hakusan (JP)

( * ) Notice: Subject to any disclaimer, the term of this patent is extended or adjusted under 35 U.S.C. 154(b) by 82 days.

(21) Appl. No.: 17/763,868

(22) PCT Filed: Nov. 27, 2019

(86) PCT No.: PCT/JP2019/046397
§ 371 (c)(1),
(2) Date: Mar. 25, 2022

(87) PCT Pub. No.: WO2021/106108
PCT Pub. Date: Jun. 3, 2021

(65) Prior Publication Data
US 2022/0326900 A1    Oct. 13, 2022

(51) Int. Cl.
*G06F 3/14* (2006.01)
*G06F 3/023* (2006.01)
*G06F 3/041* (2006.01)

(52) U.S. Cl.
CPC .......... *G06F 3/1423* (2013.01); *G06F 3/023* (2013.01); *G06F 3/0416* (2013.01)

(58) Field of Classification Search
CPC ...... G06F 3/1423; G06F 3/023; G06F 3/0416; G06F 2203/0383; G06F 3/038;
(Continued)

(56) References Cited

U.S. PATENT DOCUMENTS

2009/0122011 A1    5/2009    Timokhin et al.
2014/0075062 A1    3/2014    Yasuno et al.
(Continued)

FOREIGN PATENT DOCUMENTS

JP    2014-056430 A    3/2014
JP    2016-085690 A    5/2016

OTHER PUBLICATIONS

International Search Report dated Feb. 18, 2020 in corresponding International application No. PCT/JP2019/046397; 5 pages.
(Continued)

*Primary Examiner* — Amit Chatly
(74) *Attorney, Agent, or Firm* — Maier & Maier, PLLC

(57) ABSTRACT

A display system that smoothly switches input from one input device to input from another input device when a plurality of display devices include respective input devices. The display system includes a first display device and a second display device. The first display device includes a first display unit, a first controller, and a first input device. The second display device includes a second display unit, a second controller, and a second input device. The first display unit displays a first image outputted from at least one first computer. The second display unit displays a second image outputted from at least one second computer. The first controller receives input of first information outputted from the first input device for operating the first and second computers. The second controller receives input of second information outputted from the second input device for operating the second computer.

8 Claims, 9 Drawing Sheets

(58) Field of Classification Search
CPC ......... G06F 3/0488; G06F 2203/04803; G06F 3/0227; G06F 3/03547; G06F 3/0481; G06F 3/0412; G06F 3/14; G09G 5/12; G09G 2370/24; G02F 1/13338
See application file for complete search history.

(56) References Cited

U.S. PATENT DOCUMENTS

2016/0117276 A1    4/2016  Park et al.
2016/0321029 A1*  11/2016  Zhang ..................... G06F 3/165
2019/0250759 A1*  8/2019  Chung .................. G06F 3/0488

OTHER PUBLICATIONS

Extended European Search Report dated Aug. 5, 2022 in corresponding European Patent Application No. 19954596.3, 11 pages.

* cited by examiner

DISPLAY SYSTEM, DISPLAY METHOD, AND COMPUTER PROGRAM

TECHNICAL FIELD

The present invention relates to a display system, display method, and computer program.

BACKGROUND

KVM (K: keyboard, V: video, M: mouse) switches have been disclosed in recent years that are connected to a plurality of computers, a display device, and an input device and switch the operation computer in accordance with input from the input device (for example, Patent Literature 1) and that are cascade connected to each other. In this literature, the input device (mouse and keyboard) is connected to only one KVM switch.

CITATION LIST

Patent Literature

Patent Literature 1: Japanese Unexamined Patent Application Publication No. 2016-85690

SUMMARY

On the other hand, there are cases in which a plurality of display devices include respective input devices and computer switch mechanisms and are cascade connected to each other. In such cases, there has been a need to smoothly switch input from one input device to input from another input device.

The present invention has been made in view of the foregoing, and an object thereof is to provide a display system that smoothly switches input from one input device to input from another input device when a plurality of display devices include respective input devices.

Solution to Problem

One aspect of the present invention provides a display system including a first display device and a second display device. The first display device includes a first display unit, a first controller, and a first input device. The second display device includes a second display unit, a second controller, and a second input device. The first display unit displays a first image outputted from at least one first computer. The second display unit displays a second image outputted from at least one second computer. The first controller receives input of first information outputted from the first input device for operating the first and second computers. The second controller receives input of second information outputted from the second input device for operating the second computer. The second controller further transmits the second information received by the second controller to the first controller.

According to this configuration, the second information received by the second controller is transmitted to the first controller, allowing the first controller to grasp the latest second information. This allows a user to smoothly switch between input from the first display device and input from the second display device.

Various embodiments of the present invention are described below. Any of the embodiments described below can be combined with each other. Respective features independently form the invention.

Preferably, the first information is information specifying positions on the first display unit or the second display unit, and the second information is information specifying a position on the second display unit.

Preferably, the first information is key data, and the second information is information specifying a position on the second display unit.

Preferably, the second controller receives input of the second information on the basis of a touch operation on the second display unit.

Preferably, the first display device and/or the second display device is connected to a plurality of computers, the display unit included in the display device connected to the computers is divided into a plurality of areas so that images outputted from the connected computers are displayed on the corresponding areas, and the computer corresponding to an area targeted for an input operation among the plurality of areas is configured to be operable.

Preferably, the second display device is connected to a plurality of the second computers, the second display unit is divided into a plurality of areas so that images outputted from the second computers are displayed on the corresponding areas, and the second controller transmits information on arrangement of the areas to the first controller.

Another aspect of the present invention provides a method for controlling a display system. The display system includes a first display device and a second display device. The first display device includes a first display unit, a first controller, and a first input device. The second display device includes a second display unit, a second controller, and a second input device. The method includes a step of displaying, by the first display unit, a first image outputted from at least one first computer, a step of displaying, by the second display unit, a second image outputted from at least one second computer, a step of receiving, by the first controller, input of first information outputted from the first input device for operating the first and second computers, a step of receiving, by the second controller, input of second information outputted from the second input device for operating the second computer, and a step of transmitting, by the second controller, the second information received by the second controller to the first controller.

Yet another aspect of the present invention provides a computer program for causing a display system to function. The display system includes a first display device and a second display device. The first display device includes a first display unit, a first controller, and a first input device. The second display device includes a second display unit, a second controller, and a second input device. The computer program causes the first display unit to display a first image outputted from at least one first computer, causes the second display unit to display a second image outputted from at least one second computer, causes the first controller to receive input of first information outputted from the first input device for operating the first and second computers, causes the second controller to receive input of second information outputted from the second input device for operating the second computer, and causes the second controller to transmit the second information received by the second controller to the first controller.

Still yet another aspect of the present invention provides a display device including a display unit, a controller, and an input device. The display unit displays an image outputted from at least one computer. The controller is configured to be able to communicate with a second display device including a second display unit and a second input device. The controller receives input of first information outputted from the input device for operating the computer. The controller receives, from the second display device, second information outputted from the second input device.

DETAILED DESCRIPTION

1. Hardware Configuration of Display System 1

Figure 1:
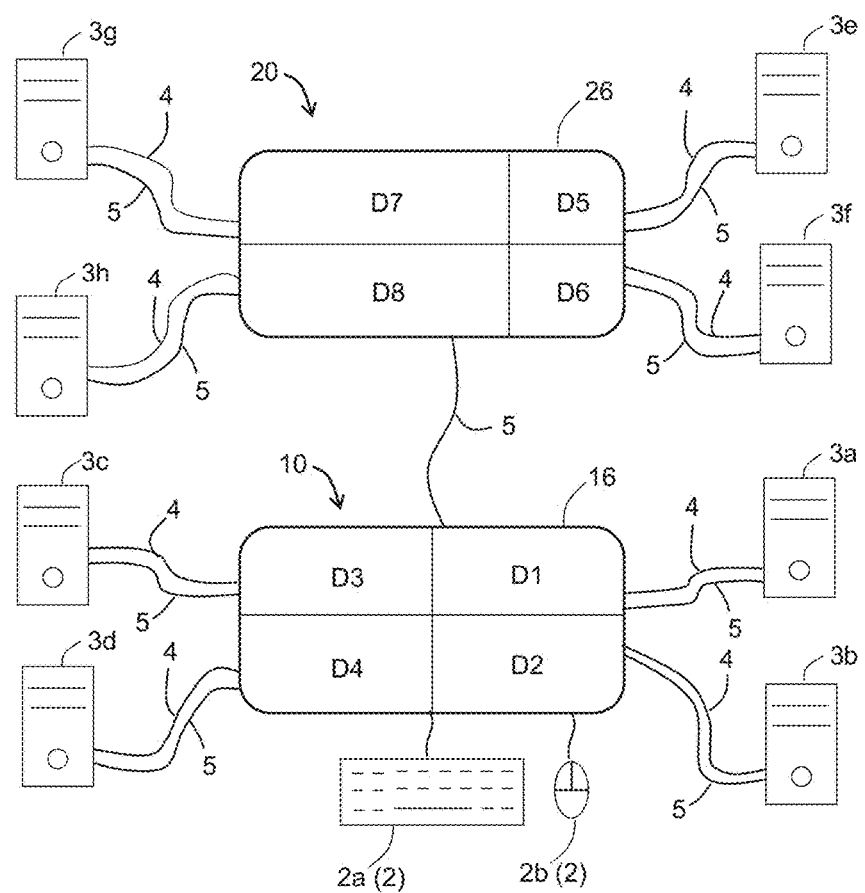
FIG. 1 is a diagram showing the hardware configuration of a display system 1.

Referring to FIG. 1, the hardware configuration of a display system 1 will be described. As shown in FIG. 1, the display system 1 includes a first display device 10, a second display device 20, and a plurality of personal computers (PCs) 3a to 3h serving as computers. The first display device 10 and second display device 20 are communicatively connected to each other through a control signal cable 5.

The first display device 10 and second display device 20 are connected to the PCs 3a to 3h through image signal cables 4 and control signal cables 5. Specifically, the first display device 10 is connected to the PC 3a to 3d serving as first computers, and the second display device 20 is connected to the PCs 3e to 3h serving as second computers. Note that each image signal cable 4 and corresponding control signal cable 5 may be combined into one cable.

A first display unit 16 included in the first display device 10 is configured to be dividable into a plurality of areas D1 to D4. Images outputted from the PCs 3a to 3d are displayed on the areas D1 to D4 of the first display unit 16 as first images. A second display unit 26 included in the second display device 20 is configured to be dividable into a plurality of areas D5 to D8. Images outputted from the PCs 3e to 3h are displayed in the areas D5 to D8 of the second display unit 26 as second images. In the present embodiment, the term "images" refers to still images or moving images.

An operation device 2 for operating the first and second computers is connected to the first display device 10. For example, the operation device 2 is a pointing device or key data output device. More specifically, the pointing device is a mouse, and the key data output device is a hardware or software keyboard. In the present embodiment, a keyboard 2a and a mouse 2b serving as the operation device 2 are connected to the first display device 10. By performing a type operation using the keyboard 2a and a cursor operation using the mouse 2b, a user is able to operate the PCs 3a to 3d connected to the first display device 10 and the PCs 3e to 3h connected to the second display device 20.

The first display unit 16 included in the first display device 10 and the second display unit 26 included in the second display device 20 have a touchscreen display function. By touching the first display unit 16, the user is able to operate the PCs 3a to 3d connected to the first display device 10. Also, by touching the second display unit 26, the user is able to operate the PCs 3e to 3h connected to the second display device 20.

2. Functional Configuration of Display System 1

(2.1. First Display Device 10)

Figure 2:
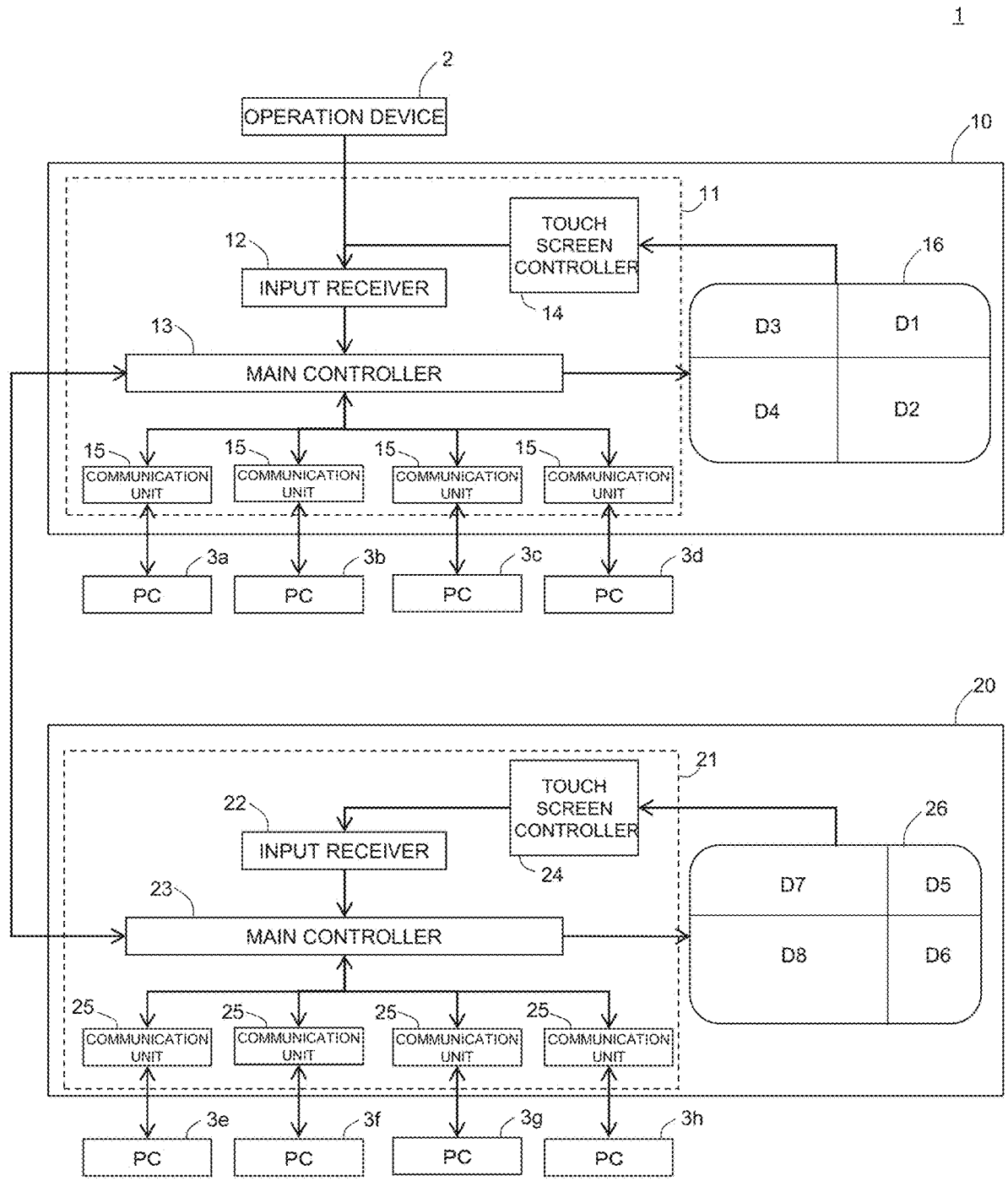
FIG. 2 is a block diagram showing the functional configuration of the display system 1.

Referring to FIG. 2, the functional configuration of the display system 1 will be described. As shown in FIG. 2, the first display device 10 includes a first controller 11 and the first display unit 16. The first controller 11 includes an input receiver 12, a first main controller 13, a touchscreen controller 14, and communication units 15.

The input receiver 12 receives input of first information outputted from the operation device 2 serving as a first input device and the touchscreen controller 14. The first main controller 13 reads a program stored in a storage unit (not shown) and performs various arithmetic processes, and consists of, for example, a CPU or the like. If input information received from the input receiver 12 is information on the movement of the cursor on the first display unit 16 or second display unit 26 using the mouse 2b, the first main controller 13 moves the cursor on the first display unit 16 or second display unit 26 on the basis of the amount of movement.

By operating the cursor on the first display unit 16 using the mouse 2b, the user is able to input the amount of movement, which is information specifying a position on the first display unit 16, to the input receiver 12 as first information. Or, by operating the cursor on the second display unit 26 using the mouse 2b, the user is able to input the amount of movement, which is information specifying a position on the second display unit 26, to the input receiver 12 as second information.

The touchscreen controller 14 consists of, for example, an electrode film having a conductive layer. The touchscreen controller 14 detects a touch operation on the first display unit 16 of the user and transmits coordinate information, which is information specifying the position on the first display unit 16, to the input receiver 12 as first information. The communication units 15 communicate various signals between the first display device 10 and PCs 3a to 3d.

The first display unit 16 displays inputted image data as an image and consists of, for example, a liquid crystal display, organic EL display, touchscreen display, electronic paper, or other type of display.

(2.2. Second Display Device 20)

The second display device 20 includes a second controller 21 and the second display unit 26. The second controller 21 includes an input receiver 22, a second main controller 23, a touchscreen controller 24 serving as a second input device, and communication units 25. The configuration of the second display device 20 is the same as the configuration of the first display device 10 except that the input receiver 22 receives input of second information, which is information specifying a position on the second display unit 26 outputted from the touchscreen controller 24, and therefore will not be described repeatedly. Information specifying the position on the second display unit 26 is, for example, information on coordinates on the second display unit 26.

The first main controller 13 of the first display device 10 and the second main controller 23 of the second display device 20 are configured to be able to bidirectionally communicate with each other through the control signal cable 5. These components are configured to be able to communicate with each other by, for example, universal serial bus (USB) communication, recommended standard 232 (RS232) communication, universal asynchronous receiver transmitter (UART) communication, or the like.

Specifically, the first main controller 13 transmits, to the second main controller 23, information received from the keyboard 2a, information received from the mouse 2b, and information on the PCs 3e to 3h connected to the second display device 20. On the other hand, the second main controller 23 transmits, to the first main controller 13, information on the arrangement of a plurality of areas of the second display unit 26 and information on a touch operation on the second display unit 26. The information on the arrangement of the areas of the second display unit 26 is, for example, information on the layout of the areas. Specifically, this information is information indicating the positions of the areas D5 to D8 of the second display unit 26. Transmission of the information on the touch operation on the second display unit 26 will be described in detail later.

The above-mentioned components may be implemented by software or hardware. In the case of software, the components are implemented by execution of a program by the CPU. The program may be stored in the internal storage unit or a computer-readable, non-transitory storage medium. Or, the program stored in an external storage unit may be executed by so-called "cloud computing." In the case of hardware, the components may be implemented by various types of circuits, such as ASIC, FPGA, and DRP.

(2.3. Management of information on Positions on First Display Unit 16 and Second Display Unit 26)

Figure 3:
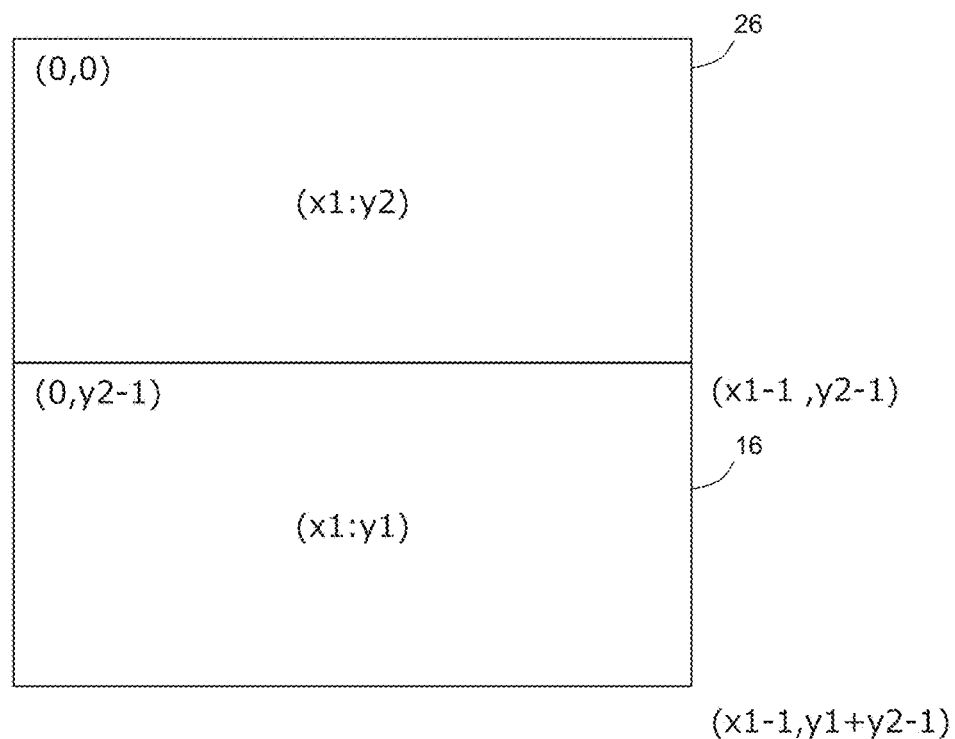
FIG. 3 is diagram showing a method by which a first main controller 13 manages positions on a first display unit 16 and a second display unit 26 using coordinates.

The first main controller 13 centrally manages information specifying positions on the first display unit 16 and second display unit 26 by converting the information into coordinate information. Specifically, as shown in FIG. 3, a coordinate system is set by arranging the first display unit 16 and second display unit 26. While FIG. 3 shows an example in which the first display unit 16 and second display unit 26 are arranged longitudinally, they may be arranged laterally.

The first main controller 13 centrally manages the position of the cursor operated using the mouse 2b and information inputted through the keyboard. This facilitates the movement of the cursor between the first display unit 16 and second display unit and the management of the information inputted through the keyboard. On the other hand, information on the positions of touches on the touchscreen displays is managed by the respective main controllers.

3. Operation of Display System 1

Referring to FIGS. 4 to 7, the operation of the display system 1 according to the present embodiment will be described. In FIGS. 4 to 7, hatch lines are drawn on an area to be subjected to various operations (that is, a type operation using the keyboard 2a, a cursor operation using the mouse 2b, or a touch operation on the touchscreen) among the areas of the first display unit 16 or second display unit 26.

Figure 4:
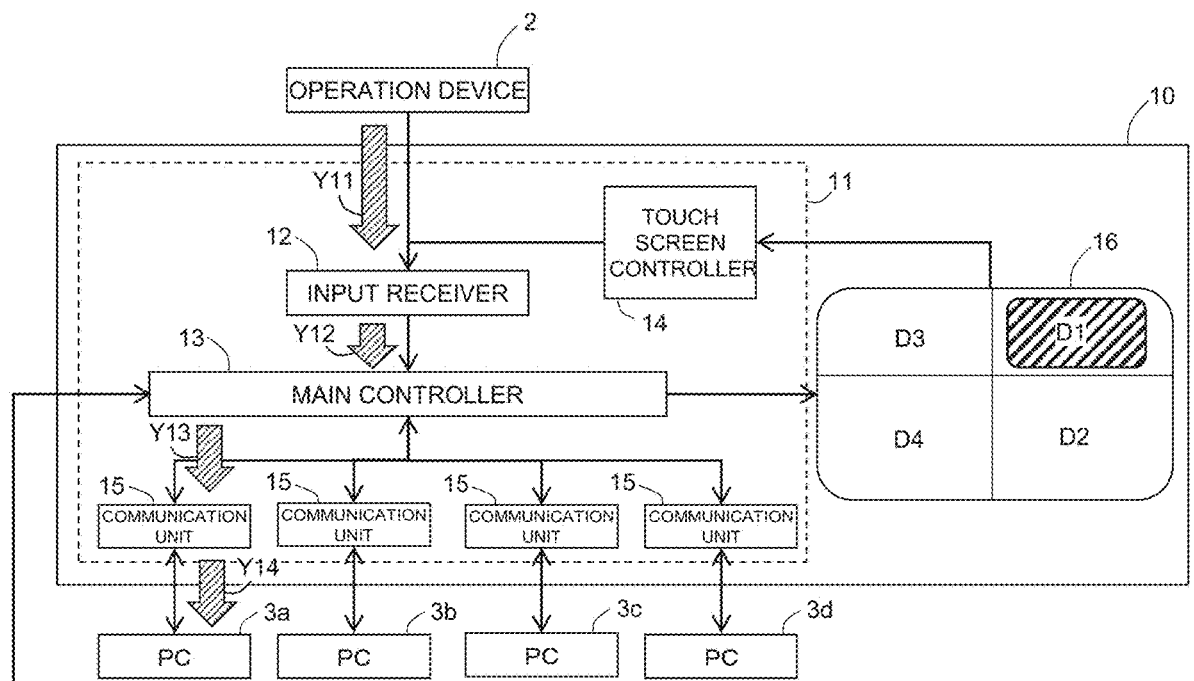
FIG. 4 is a diagram showing operations performed by the display system 1 when a user performs an operation with respect to an area of a first display device 10 using an operation device 2.
Figure 4:
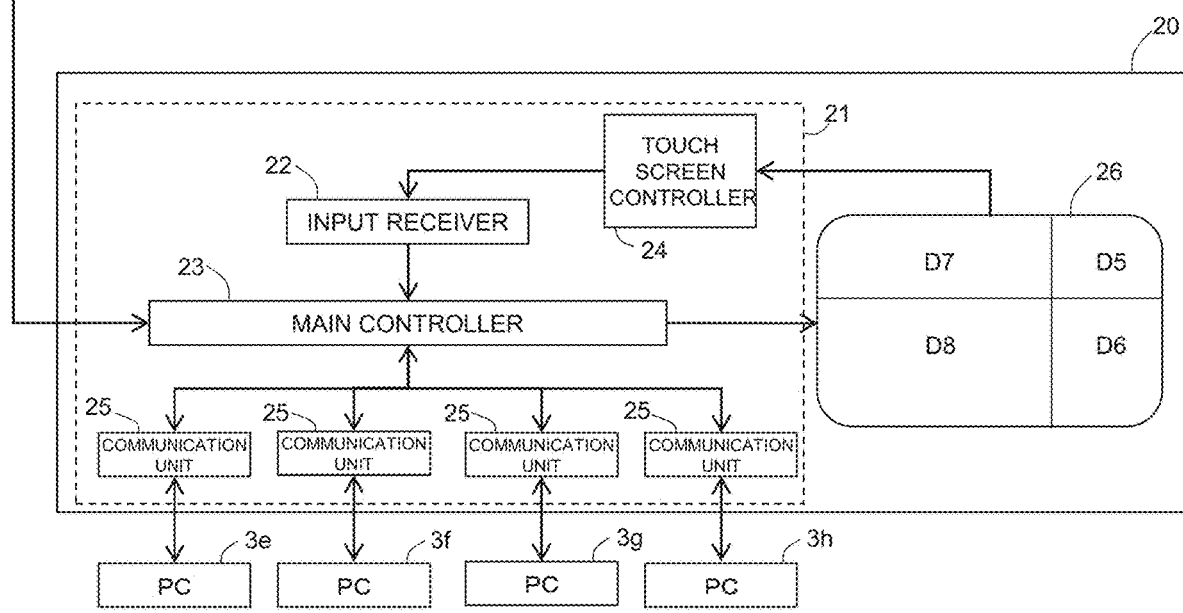

As shown in FIG. 4, when information is inputted to the area D1 of the first display device 10 using the operation device 2, the PC 3a corresponding to the area D1 is operated. At this time, the information inputted through the operation device 2 is transmitted to the input receiver 12, first main controller 13, and communication unit 15 in the order of arrows Y11 to Y14 and then transmitted to the PC 3a corresponding to the area D1.

For example, when the keyboard 2a is operated as the operation device 2, the operation device 2 transmits key data to the input receiver 12 (arrow Y11). The first main controller 13 transmits the key data to the PC 3a (arrows Y13, Y14).

When the mouse 2b is operated as the operation device 2, the operation device 2 transmits the amount of movement to the input receiver 12 (arrow Y11). The first main controller 13 transmits, to the PC 3a, coordinate information indicating the position of the cursor calculated on the basis of the amount of movement (arrows Y13, Y14). As an example, when the cursor in the area D1 is moved to the area D2, the operation PC is switched from the PC 3a to the PC 3b. When the user moves the cursor in the area D2 to the area D5, the operation PC is switched from the PC 3b to the PC 3e.

Figure 5:
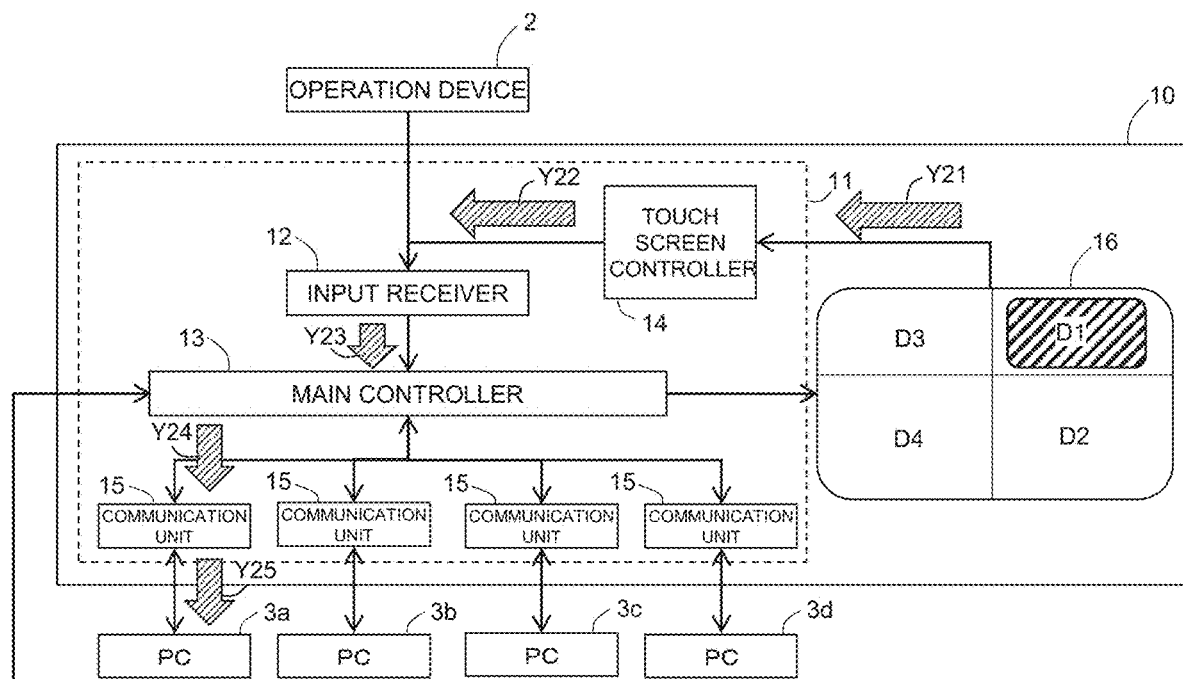
FIG. 5 is a diagram showing operations performed by the display system 1 when the user performs an operation with respect to the area of the first display device 10 by operating the touchscreen of the first display unit 16.
Figure 5:
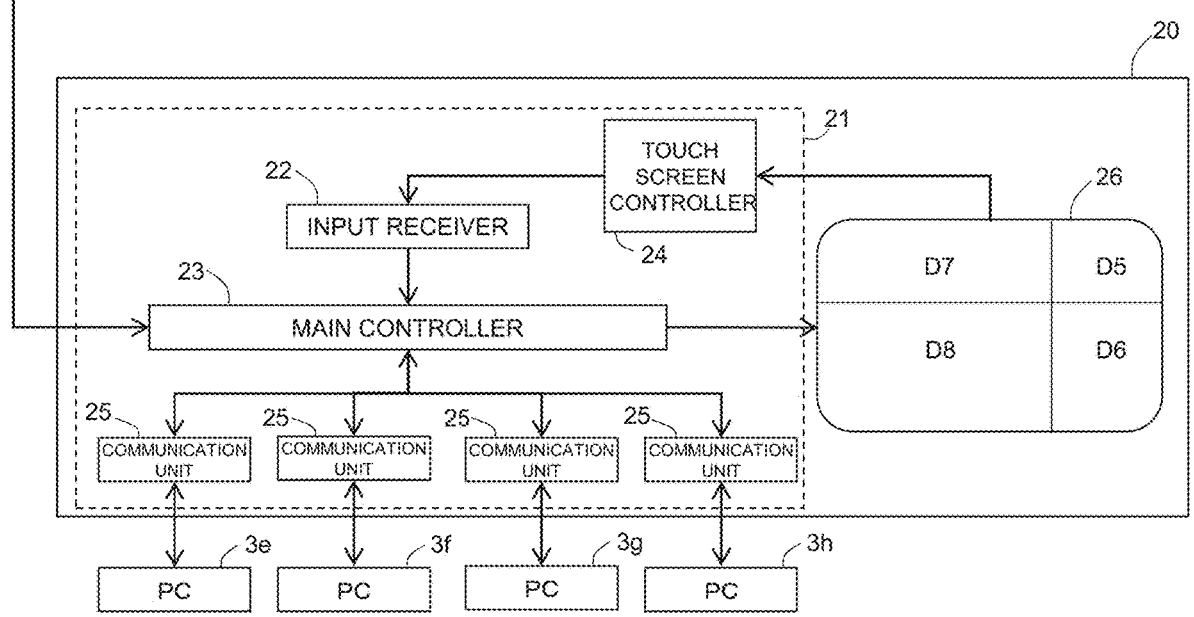

As shown in FIG. 5, when information is inputted to the area D1 of the first display device 10 by operating the touchscreen of the first display unit 16, the PC 3a corresponding to the area D1 is operated. At this time, the information inputted through the first display unit 16 is transmitted to the touchscreen controller 14, input receiver 12, first main controller 13, and communication unit 15 in the order of arrows Y21 to Y25 and then transmitted to the PC 3a corresponding to the area D1.

Figure 6:
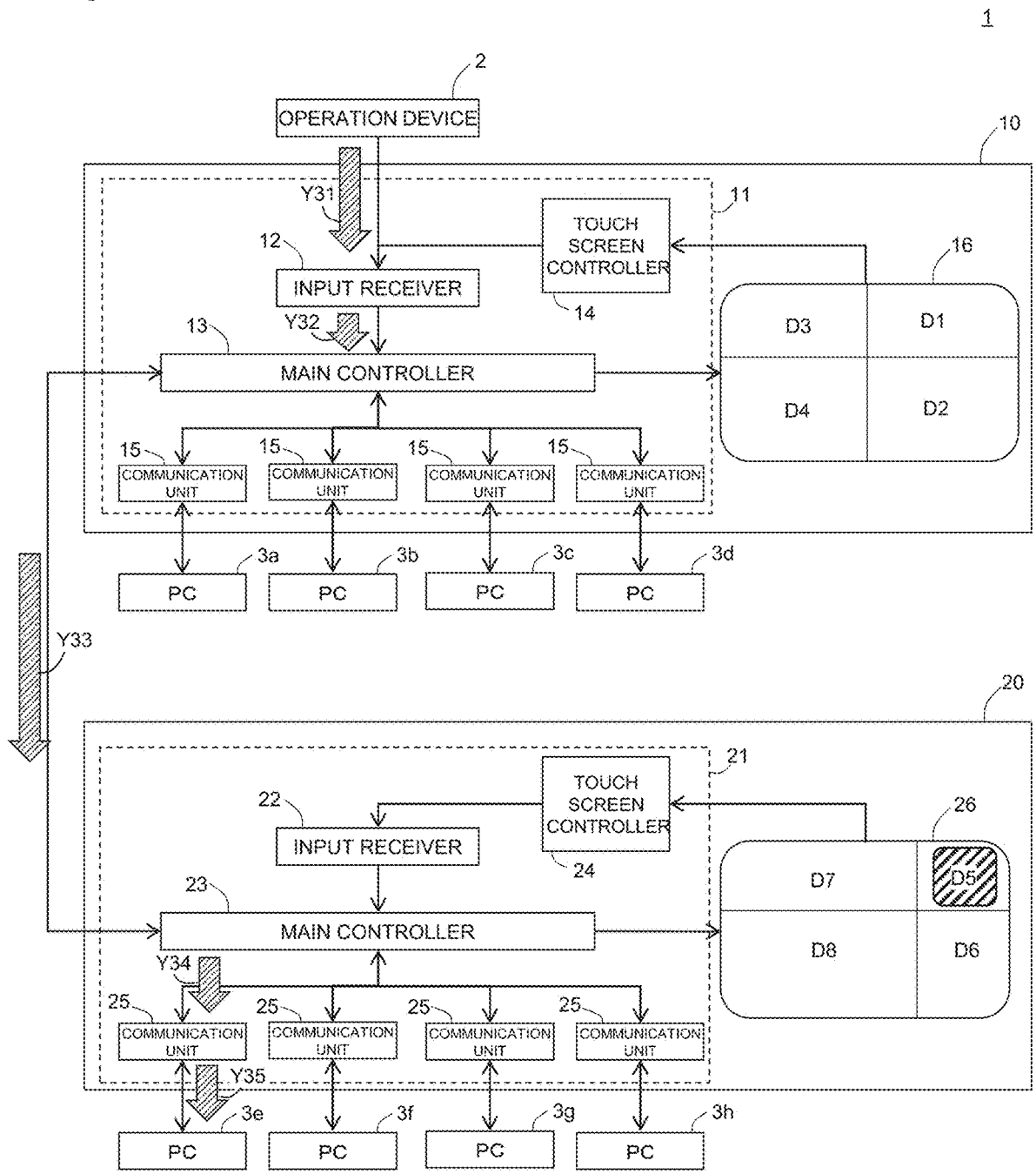
FIG. 6 is a diagram showing operations performed by a display system 1 when the user performs an operation with respect to an area of the second display device 20 using the operation device 2.

As shown in FIG. 6, when information is inputted to the area D5 of the second display device 20 using the operation device 2, the PC 3e corresponding to the area D5 is operated. At this time, the information inputted using the operation device 2 is transmitted to the input receiver 12, first main controller 13, second main controller 23, and communication unit 25 in the order of arrows Y31 to Y35 and then transmitted to the PC 3e corresponding to the area D5.

Figure 7:
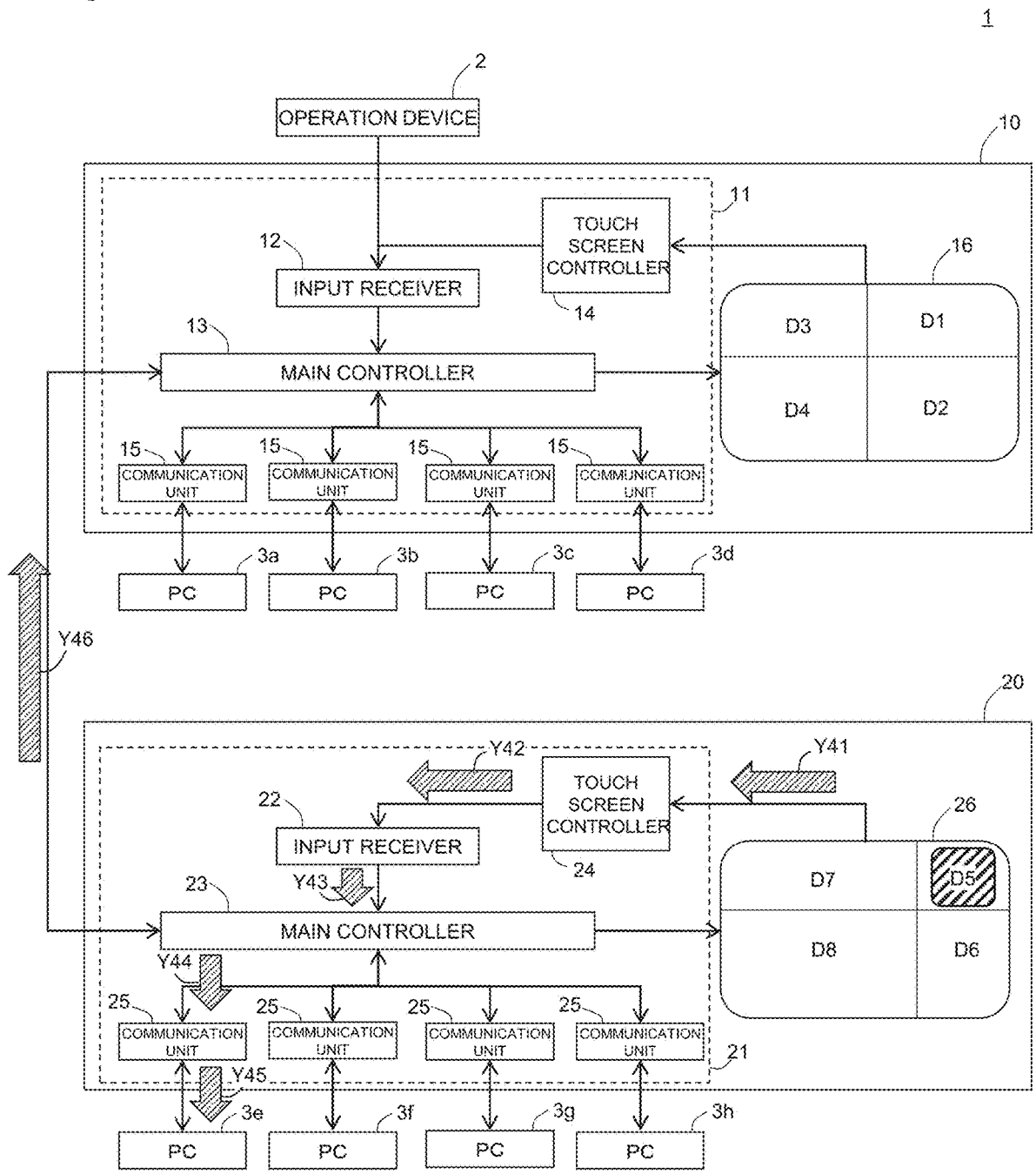
FIG. 7 is a diagram showing operations performed by the display system 1 when the user performs an operation with respect to the area of the second display device 20 by operating the touchscreen of the second display unit 26.

As shown in FIG. 7, when information is inputted to the area D5 of the second display device 20 by operating the touchscreen of the second display unit 26, the PC 3e corresponding to the area D5 is operated. At this time, the information inputted through the second display unit 26 is transmitted to the touchscreen controller 24, input receiver 22, second main controller 23, and communication unit 25 in the order of arrows Y41 to Y45 and then transmitted to the PC 3e corresponding to the area D5.

The second main controller 23 further transmits the second information received by the input receiver 22 to the first main controller 13 (arrow Y46). This allows the first main controller 13 to grasp the touch position in the currently operating area D5 (corresponding to the second information) in real time.

Thus, when the mouse 2b is operated as an input device in the middle of touching the area D5 of the second display device 20, a cursor position is displayed so that the latest touch position becomes the latest cursor position. Or, when the keyboard 2a is operated as an input device in the middle of touching the area D5 of the second display device 20, the keyboard 2a is enabled to be operated in an area corresponding to the latest touch position. As seen above, input from one input device is smoothly switched to input from another input device.

As described above, the display system 1 includes the first display device 10 and second display device 20. The first display device 10 includes the first display unit 16, the first controller 11, and the first input device including the operation device 2 and touchscreen controller 14. The first display unit 16 displays first images outputted from the plurality of PCs 3a to 3d. The first controller 11 receives input of first information outputted from the first input device for operating the PCs 3a to 3h.

The second display device 20 includes the second display unit 26, the second controller 21, and the second input device including the touchscreen controller 24. The second display unit 26 displays second images outputted from the plurality of PCs 3e to 3h. The second controller 21 receives input of second information outputted from the second input device for operating the PCs 3e to 3h. The second controller 21 further transmits the second information received by the second controller 21 to the first controller 11.

The above configuration allows for smoothly switching input from one input device to input from another input device when a plurality of display devices include respective input devices.

4. Other Embodiments

The range to which the technical idea of the present application is applied is not limited to the above embodiment. While, in the above embodiment, the plurality of PCs are connected to the first display device 10 and second display device 20, this embodiment is not limiting and, for example, only one PC may be connected to the first display device 10, and only one PC may be connected to the second display device 20.

Figure 8:
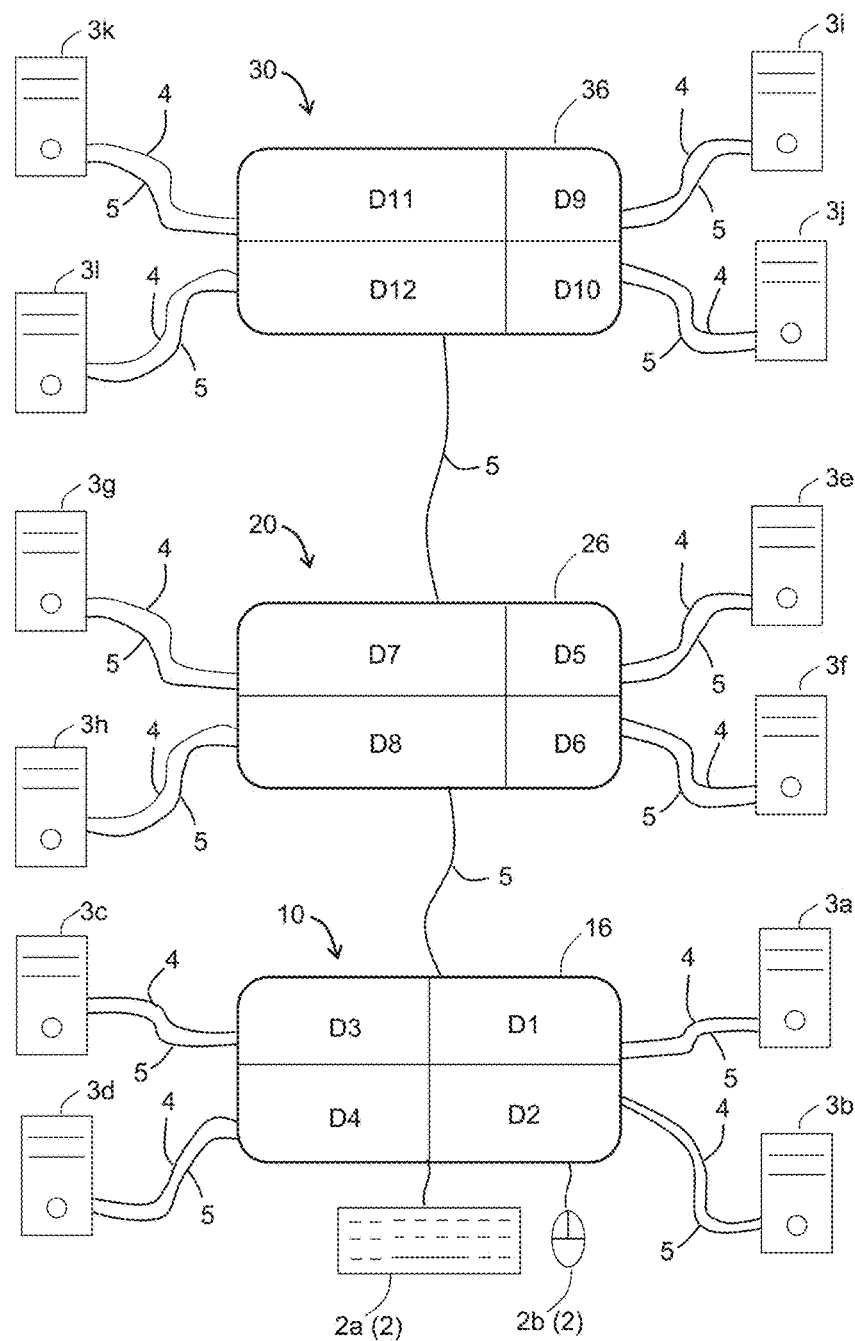
FIG. 8 is a diagram showing the hardware configuration of a display system 1 in which a plurality of display devices are cascade connected.
Figure 9:
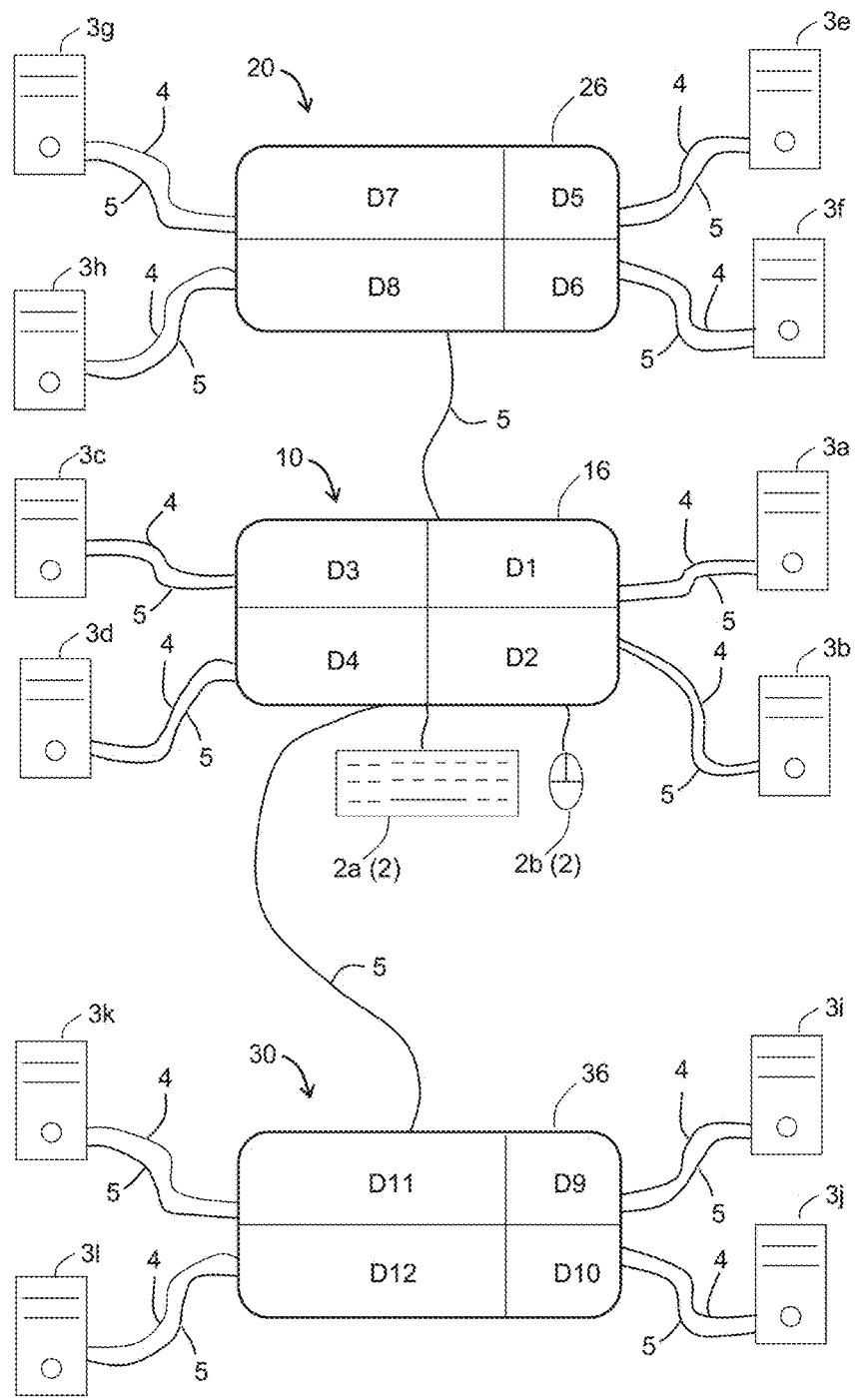
FIG. 9 is a diagram showing the hardware configuration of a display system 1 in which a plurality of display devices are connected in parallel.

The display system 1 may include three or more display devices. In this case, a plurality of display devices may be cascade connected as shown in FIG. 8, or a plurality of display devices may be connected to a first display device 10 including an operation device 2 in parallel as shown in FIG. 9.

The first display device 10 may include only the keyboard 2a as the operation device 2. In this case, the display system may be configured such that the user is able to input general key data from the keyboard 2a and to switch the operation PC by operating a predetermined shortcut key. Such a configuration, which does not include the mouse 2b, also allows the user to input information specifying positions on the first and second display units through the first input device, and the technical idea of the present application can be applied to this configuration.

The first display device 10 may be configured such that it does not include the touchscreen controller 14 but rather includes only the operation device 2 as the first input device.

The second display device 20 may be configured such that it does not include the touchscreen controller 14 but rather includes a recognition device using an imaging device such as a camera (e.g., line-of-sight recognition device), a speech input device, or the like as the second input device.

While, in the above embodiment, the operation device 2 is connected to only the first display device, this form is not limiting and the operation device 2 may be connected to the second display device.

The present invention may be embodied as a computer-readable, non-transitory storage medium storing the above program.

While various embodiments according to the present invention have been described, the embodiments are only illustrative and are not intended to limit the scope of the invention. Various omissions, replacements, or changes can be made to the embodiments without departing from the spirit and scope of the invention. The embodiments and modifications thereof are included in the spirit and scope of the present invention, as well as included in the scope of the invention set forth in the claims and equivalents thereof.

REFERENCE SIGNS LIST

1: display system, 2: operation device (first input device), 2a: keyboard, 2b: mouse, 4: image signal cable, 5: control signal cable, 10: first display device, 11: first controller 11, 12: input receiver, 13: first main controller, 14: touchscreen controller (first input device), 15: communication unit, 16: first display unit, 20: second display device, 21: second controller, 22: input receiver, 23: second main controller, 24: touchscreen controller (second input device), 25: communication unit, 26: second display unit

The invention claimed is:

1. A display system comprising a first display device and a second display device,
   wherein the first display device comprises a first display unit, a first controller, and a first input device,
   wherein the second display device comprises a second display unit, a second controller, and a second input device,
   wherein the first display unit displays a first image outputted from at east one first computer,
   wherein the second display unit displays a second image outputted from at east one second computer,
   wherein the first controller receives input of first information outputted from the first input device for operating the first and second computers, the first information being information specifying a position on the first display unit or the second display unit,
   wherein the second controller receives input of second information outputted from the second input device for operating the second computer, the second information being information specifying a position on the second display unit,
   wherein the second controller further transmits the second information received by the second controller to the first controller,
   wherein the first controller centrally manages information specifying positions on the first display unit and the second display unit based on the first information and the second information, and
   wherein the display system is configured so that the first or second computer based on the first information is operated when the first information is output from the first input device and the second computer based on the second information is operated when the second information is output from the second input device.

2. The display system of claim 1, wherein the first information is key data.

3. The display system of claim 1, wherein the second controller receives input of the second information on the basis of a touch operation on the second display unit.

4. The display system of claim 1,
wherein at least one of the first display device and the second display device is connected to a plurality of computers,
wherein the display unit included in the display device connected to the computers is divided into a plurality of areas so that images outputted from the connected computers are displayed on the corresponding areas, and
wherein the computer corresponding to an area targeted for an input operation among the plurality of areas is configured to be operable.

5. The display system of claim 1,
wherein the second display device is connected to a plurality of the second computers,
wherein the second display unit is divided into a plurality of areas so that images outputted from the second computers are displayed on the corresponding areas, and
wherein the second controller transmits information on arrangement of e areas to the first controller.

6. A method for controlling a display system,
wherein the display system comprises a first display device and a second display device,
wherein the first display device comprises a first display unit, a first controller, and a first input device,
wherein the second display device comprises a second display unit, a second controller, and a second input device, the method comprising:
a step of displaying, by the first display unit, a first image outputted from at least one first computer;
a step of displaying, by the second y unit, a second image outputted troy at leas second computer;
a step of receiving, by the first controller, input of first information outputted from the first input device for operating the first and second computers, the first information being information specifying a position on the first display unit or the second display unit;
a step of receiving, by the second controller, input of second information outputted from the second input device for operating the second computer, the second information being information specifying a position on the second display unit;
a step of transmitting, by the second controller, second information received by the second controller to the first controller;
a step of centrally managing, by the first controller, information specifying positions on the first display unit and the second display unit based on the first information and the second information; and
wherein the display system is configured so that the first or second computer based on the first information is operated when the first information is output from the first input device and the second computer based on the second information is operated when the second information is output from the second input device.

7. A non-transitory computer-readable storage medium storing a computer program for causing a display system to function,
wherein the display system comprises a first device and a second display device,
wherein the first display device comprises a first display unit, a first controller, and a first input device,
wherein the second display device comprises a second display unit, a second controller, and a second input device, the computer program causing:
the first display unit to display a first image outputted from at least one first computer;
the second display unit to display a second image outputted from at least one second computer;
the first controller to receive input of first information outputted from the first input device for operating the first and second computers, the first information being information specifying a position on the first display unit or the second display unit;
the second controller to receive input of second information outputted from the second input device for operating the second computer, the second information being information specifying a position on the second display unit;
the second controller to transmit the second information received by the second controller to the first controller;
the first controller to centrally manage information specifying positions on the first display unit and the second display unit based on the first information and the second information; and
wherein the display system is configured so that the first or second computer based on the first information is operated when the first information is output from the first input device and the second computer based on the second information is operated when the second information is output from the second input device.

8. A display device comprising:
a display unit;
a controller; and
an input device,
wherein the display unit displays an image outputted from at least e first computer,
wherein the controller is configured to be able to communicate with a second display device comprising a second display unit for displaying a second image outputted from at least one second computer and a second input device for operating the second computer,
wherein the controller receives input of first information outputted from the input device for operating the first and second computers, the first information being information specifying a position on the display unit or the second display unit,
wherein the controller receives, from the second display device, second information outputted from the second input device, the second information being information specifying a position on the second display unit,
wherein the controller centrally manages information specifying positions on the first display unit and the second display unit based on the first information and the second information, and
wherein the display device is configured so that the first or second computer based on the first information is operated when the first information is output from the first input device and the second computer based on the second information is operated when the second information is output from the second input device.

* * * * *